(No Model.)

N. SPOFFORD.
CAST FAUCET JOINT.

No. 274,402. Patented Mar. 20, 1883.

Witnesses.
Louis F. Gardner
E. D. York

Inventor:
Nelson Spofford,
per
F. A. Lehmann,
Atty.

UNITED STATES PATENT OFFICE.

NELSON SPOFFORD, OF HAVERHILL, MASSACHUSETTS.

CAST FAUCET-JOINT.

SPECIFICATION forming part of Letters Patent No. 274,402, dated March 20, 1883.

Application filed October 23, 1882. (No model.)

*To all whom it may concern:*

Be it known that I, N. SPOFFORD, of Haverhill, in the county of Essex and State of Massachusetts, have invented certain new and useful Improvements in Cast Faucet-Joints; and I do hereby declare the following to be a full, clear, and exact description of the invention, such as will enable others skilled in the art to which it pertains to make and use it, reference being had to the accompanying drawings, which form part of this specification.

My invention relates to an improvement in cast faucet-joints; and it consists in the combination, with a faucet and pipe, of an imitation wipe-joint provided with ears, the joint being made to unite the faucet and joint, as will be more fully described hereinafter.

The object of my invention is to provide an imitation wipe-joint for securing faucets to the service-pipes, and which joint can be readily cast by men little skilled in the art, and thus dispense with the high-price wipe-joints which have heretofore been used, and which can be made only by highly-skilled workmen.

Figure 1:
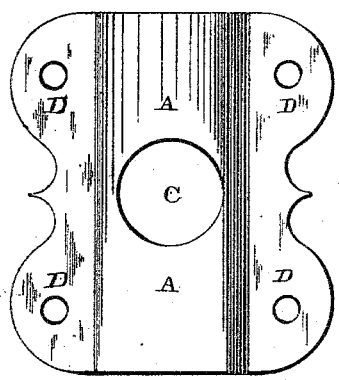
Figure 2:
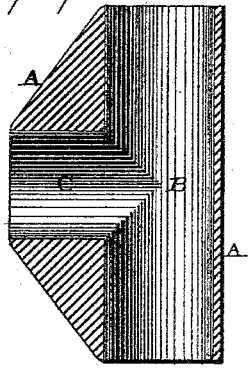
Figure 3:
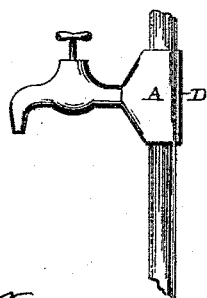

Figure 1 is a front elevation of a coupling complete. Fig. 2 is a vertical section of the same. Fig. 3 is a view of a short section of pipe having the faucet secured thereto by means of the joint.

The joint consists of the body A, having the vertical circular aperture B for the service-pipe and the horizontal circular aperture C for the faucet. Cast with the body, in a single piece, are the perforated ears D, by means of which the joint is secured to the wall or any other suitable support. In applying this joint, which is an imitation of a wipe-joint, the faucet is first lightly secured to a section of the service-pipe by any suitable means, and then the pipe and the end of the faucet are inclosed in a suitable mold and the melted metal is poured around them. This metal forms the joint, as shown in Fig. 3, and produces a perfect imitation wipe-joint, which can be readily made by any workman.

Where it is desired to furnish pipes in short sections to the trade, having the faucets attached to them, the sections of the pipe to which the faucets are attached will be made tolerably short, and then the faucet attached thereto by means of the imitation wipe-joint, as shown. These sections of pipe, with the faucets attached, can then be placed upon the market and sold, ready to be attached to the main service-pipe by a single joint of any kind at each end.

Heretofore joints have been made with semi-cylindrical recesses in their rear sides to receive the service-pipes, and provided with circular apertures at their centers to receive the faucets. My present improvement consists in an improvement over the joint before referred to, in that the joint is cast directly around the pipe or pipes, or the pipe and faucet, so as to produce a perfect wipe-joint having the perforated ears formed as a part thereof in a single piece; or I make my imitation wipe-joint separately from the pipe and faucet, as before, only substituting for the semi-cylindrical recess a circular aperture for the reception of the service-pipe, which, together with the faucet, may be tightly secured, either with solder or screw-joints.

Having thus described my invention, I claim—

In combination with a faucet and pipe, an imitation wipe-joint, A, provided with ears D, said joint uniting the faucet and pipe, substantially as set forth.

In testimony whereof I affix my signature in presence of two witnesses.

NELSON SPOFFORD.

Witnesses:
  JEREMIAH P. JONES,
  NATHANIEL N. JONES.